March 3, 1931. N. M. MYGAS 1,794,529
SPRING TIRE
Filed Nov. 29, 1929 2 Sheets-Sheet 1
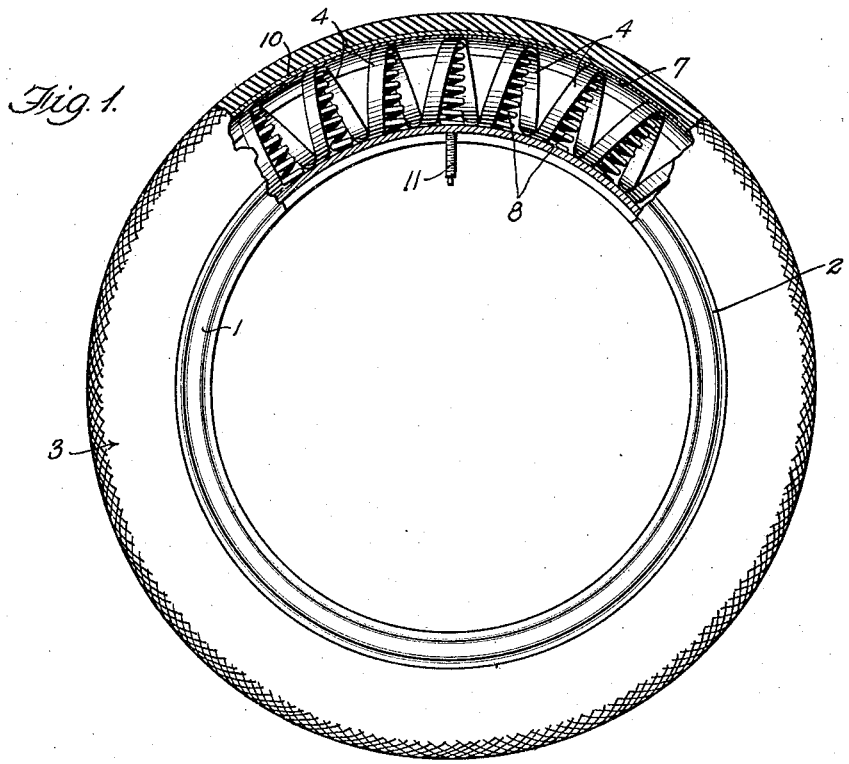
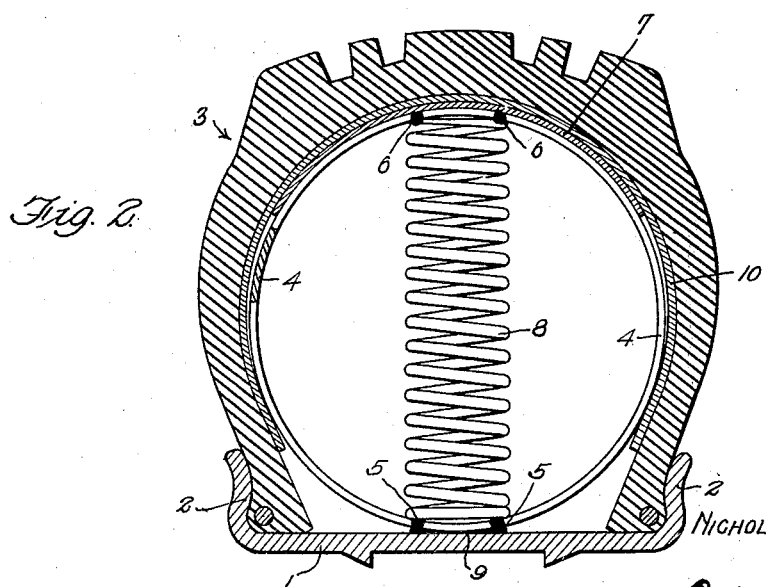
Inventor
Nicholas M. Mygas
By E. H. Bond
Attorney March 3, 1931. N. M. MYGAS 1,794,529
SPRING TIRE
Filed Nov. 29, 1929   2 Sheets-Sheet 2

Inventor
NICHOLAS M. MYGAS.
By E. H. Bond
Attorney

Patented Mar. 3, 1931

1,794,529

UNITED STATES PATENT OFFICE

NICHOLAS M. MYGAS, OF WEST ORANGE, NEW JERSEY

SPRING TIRE

Application filed November 29, 1929. Serial No. 410,607.

This invention relates to certain new and useful improvements in spring tires of that general class embodying means for insuring the requisite amount of resiliency such as obtained by the use of a pneumatic rubber tire, and which shall be much less liable to injury, shall be more durable, and less expensive as to the initial cost and the upkeep of which will be materially lessened.

A wheel equipped with my improved tire is wholly unaffected by punctures, is not subject to blow-outs, can be easily and cheaply constructed, and its lasting qualities and durability is far in excess of any of the best-known makes of pneumatic tires.

Other objects and advantages of the invention will hereinafter appear, and the novel features thereof will be specifically defined by the appended claim.

The invention, in its preferred form is clearly illustrated in the accompanying drawings, which, with the numerals of reference marked thereon, form a part of this specification, and in which Figure 1 is a side elevational view of a spring tire constructed in accordance with my invention, with parts broken away.

Figure 2 is a transverse sectional view of the same.

Figure 3:
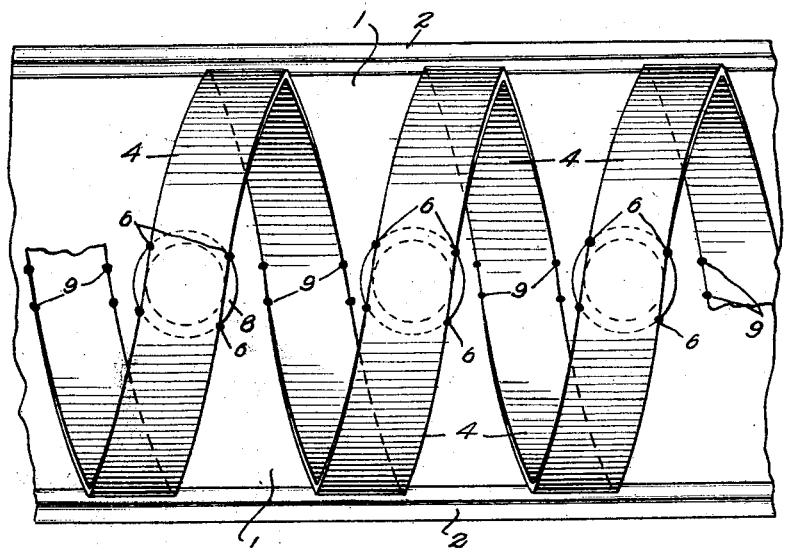

Figure 3 is an enlarged detail in top plan with portions broken away.

Figure 4:
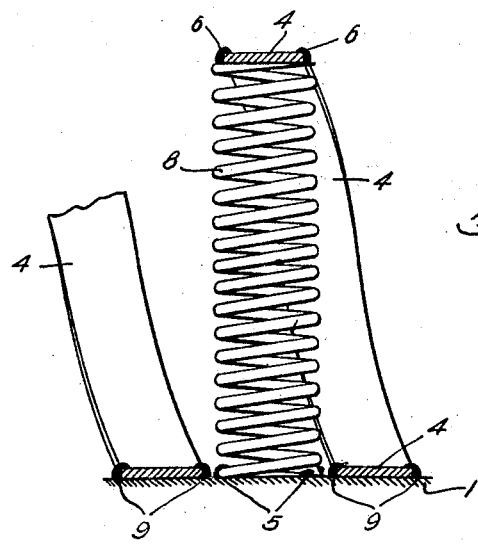

Figure 4 is a detail partly in section with portions broken away.

Like numerals of reference indicate like parts throughout the several views.

Referring to the details of the drawings by numerals, 1 is a band designed to be disposed on the rim of a wheel, not shown, the same having inturned flanges 2, as seen best in Figure 2, to engage the tire or shoe 3 in the usual manner, these several parts being conventional in type and forming no part of the present invention.

4 is a helical spring of flat material, each convolute being welded or otherwise secured at opposite points as at 9 and 6, see Figure 1, to the band 1 and the steel member 7 which may be of greater or less extent, as occasion may require.

8 are helically-wound compression springs which are disposed as seen best in Figure 1, see also Figure 4, in which they are shown as each having one end secured to a convolute of the spring 4, and the other end secured as at 5 to the member 1, by welding or otherwise. These springs 8 are secured at one end to the outer bend of the convolute and at the other end to the member 1 between the points of contact of the convolutes with such member, shown best in Figure 4. The springs are thus disposed radially while the bends of the convolutes are inclined in opposite directions between such points of contact, see Figure 1. The material of the convolute spring is flat as seen in Figures 3 and 4 in order to give a broad bearing at the outer and inner faces of the tire as will be readily understood from Figures 3 and 4.

The metal member 7 may vary in its extent and is encased in a layer of canvas or similar material 10 the extent of which may, also, be varied within safe limits. Leather or other suitable material may be employed in lieu of the canvas.

The broad band of which the helical spring is composed affords a substantial bearing surface and when the outer shoe 3 is in place a broad bearing is provided.

In applying the outer member 3 I inflate the tire while vulcanizing, increasing the inflation as the vulcanizing continues, and then let the air out. I have found that the air keeps the rubber from getting too hot and soft. For this purpose I provide the inflating tube 11, with valve of usual construction. This valve may remain in the tire or be removed after the tire is complete, as may be thought best.

The continuous flat helical spring, together with the springs 8, arranged as shown, form a very substantial spring tire the flat spring forming relatively large surfaces to receive the thrust of the tire shoe, which if excessive will cause the same to give or yield in the direction of the pressure applied, but they will immediately recover their normal position and thus afford a substantial resiliency, equal to that of the usual pneumatic tire, without the disadvantages of the latter. This effect is supplemented by the springs 8 which, being disposed at a different diametrical and radial relation between each of the coils exert an outward pressure against the tread portion of the tire and insure a substantial resistance to any tendency to be distorted and at all times causing the tire to assume and maintain the same appearance as a pneumatic tire without any of the objectional features of the latter.

The life of a tire of this character has been proven to be many times that of the best pneumatic tire now known.

The terms and expressions which I have employed are used as terms of description and not of limitation, and I have no intention, in the use of such terms and expressions, of excluding any equivalents of the features shown and described, or portions thereof, but recognize that various modifications are possible within the scope of the invention claimed.

It is deemed important that the spring 4 be relatively wide and that the convolutes be welded or permanently affixed to the band 1 so that the position of the parts remain practically unchanged during the use of the tire, and that the members 1 and 7 and the convolutes of the spring 4 and the springs 8 remain substantially the same throughout their use as by this means greater rigidity or stability of the tire is maintained under all conditions of use.

It is deemed important that the construction and arrangement of the various parts be such that there is practically no relative change in position of the members 4 and 8 in use, so that the resiliency is maintained substantially the same under all conditions, the springs 8 and the member 4 yielding sufficiently under pressure but without relative movement of these parts. This makes a much better and more even riding of the car.

What is claimed as new is;—

A resilient tire comprising in combination, a shoe and a band around which the shoe is secured, a band within said shoe and spaced from said first-mentioned band, a helical spring of relatively broad material, the latter being circumferentially disposed within and enveloped by the said shoe and said second mentioned band and fixedly secured at the bends thereof to each of said bands to maintain substantially the same relative positions of the said parts, and helically wound compression springs disposed radially and secured at their ends to the inner surface of the first-named spring and to the said first mentioned band, intermediate the points of securement of the helical spring thereto, the said first named spring and the compression springs acting in unison to cushion shock.

In testimony whereof I affix my signature.

NICHOLAS M. MYGAS.